April 9, 1946.   C. G. JOHNSON   2,398,010
AUTOMATIC PHONOGRAPH
Filed Jan. 11, 1939    11 Sheets-Sheet 2

Inventor
Carl G. Johnson
By Williams, Bradbury, McCaleb & Hinkle
Attys.

April 9, 1946.   C. G. JOHNSON   2,398,010
AUTOMATIC PHONOGRAPH
Filed Jan. 11, 1939   11 Sheets-Sheet 3

Inventor
Carl G. Johnson
By Williams, Bradbury, McCaleb & Hinkle
Attys.

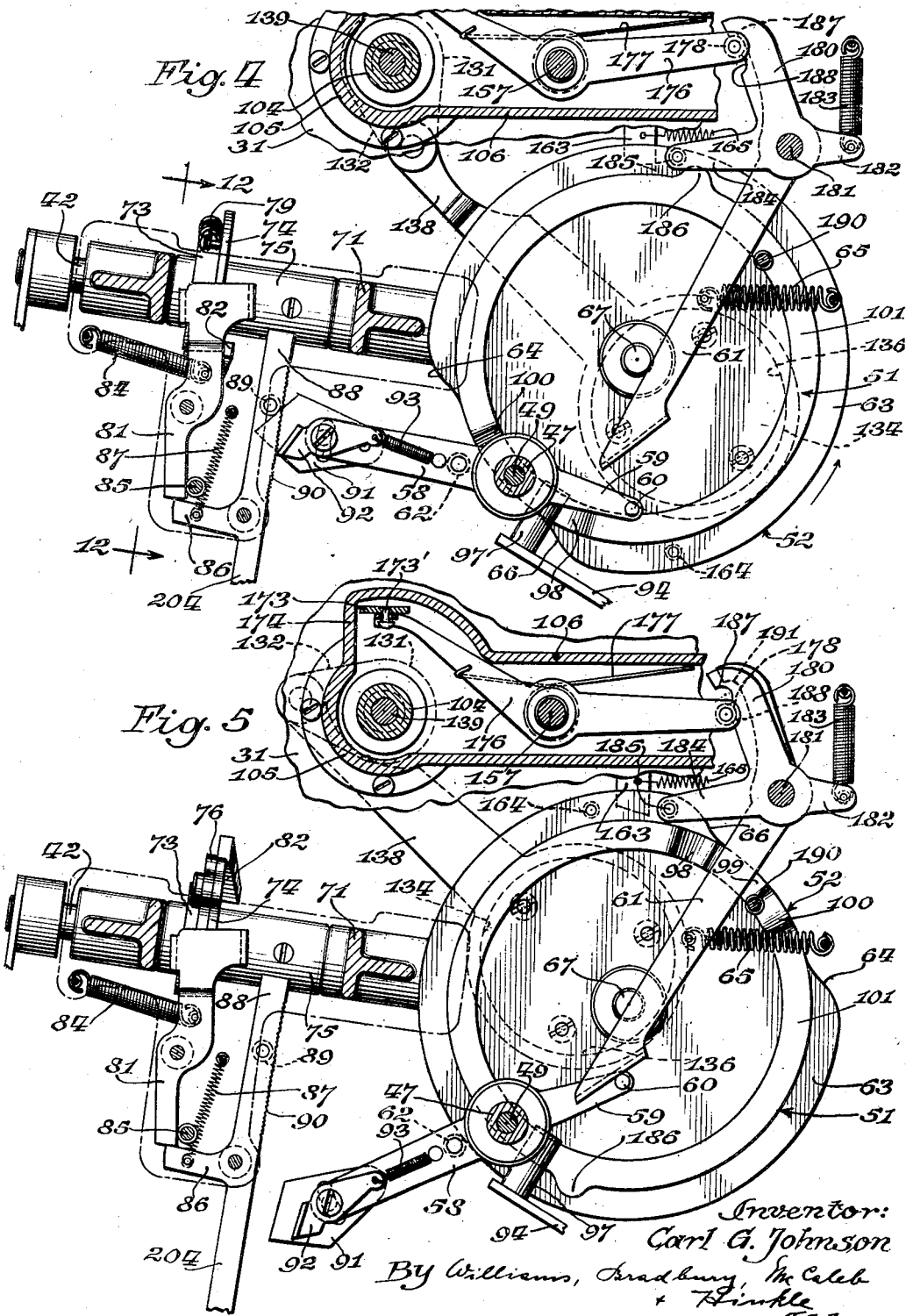

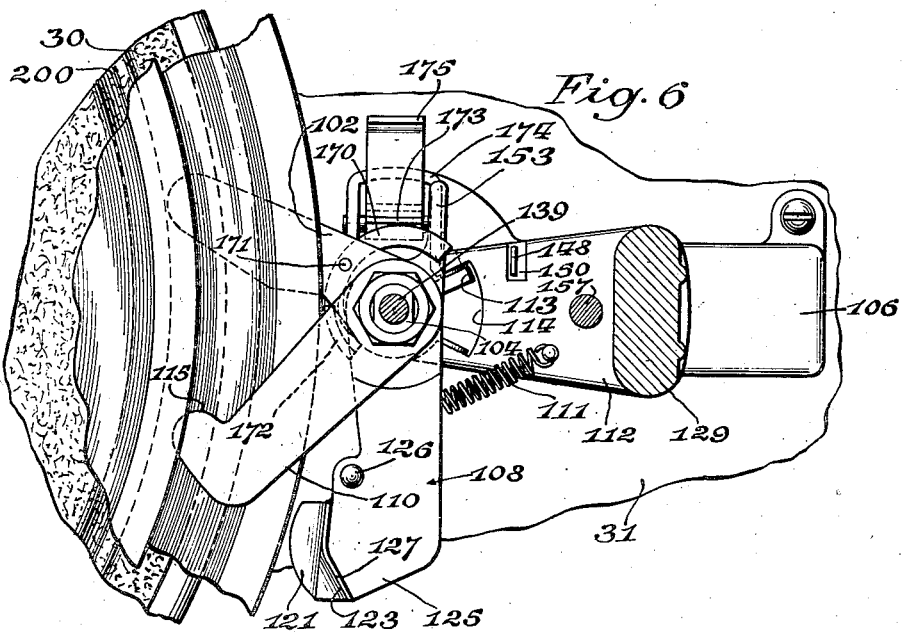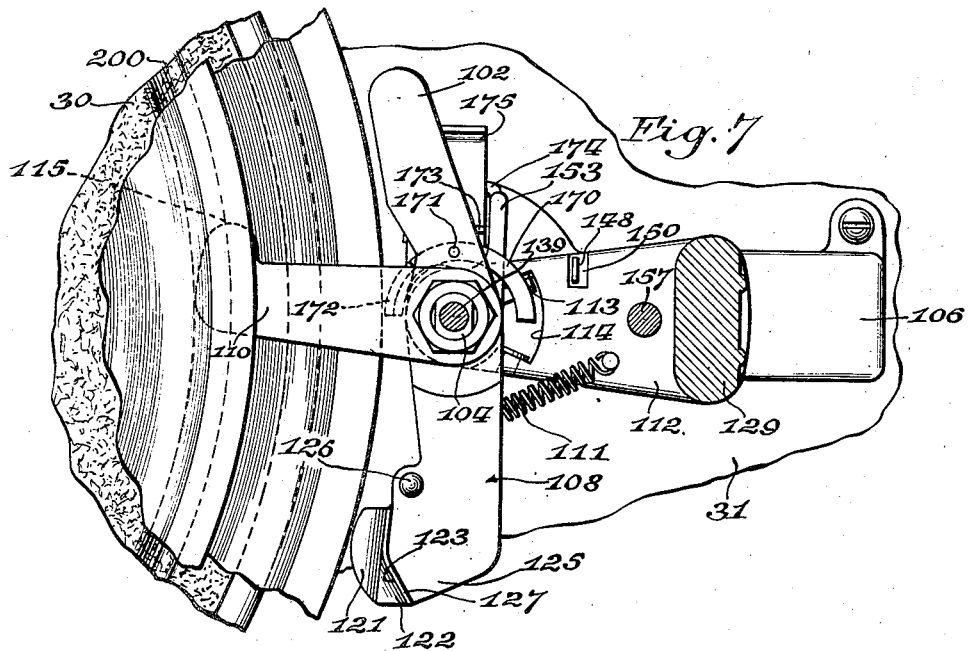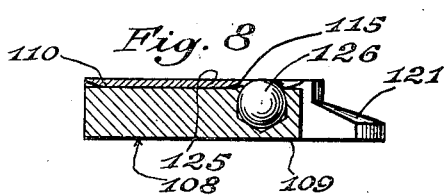

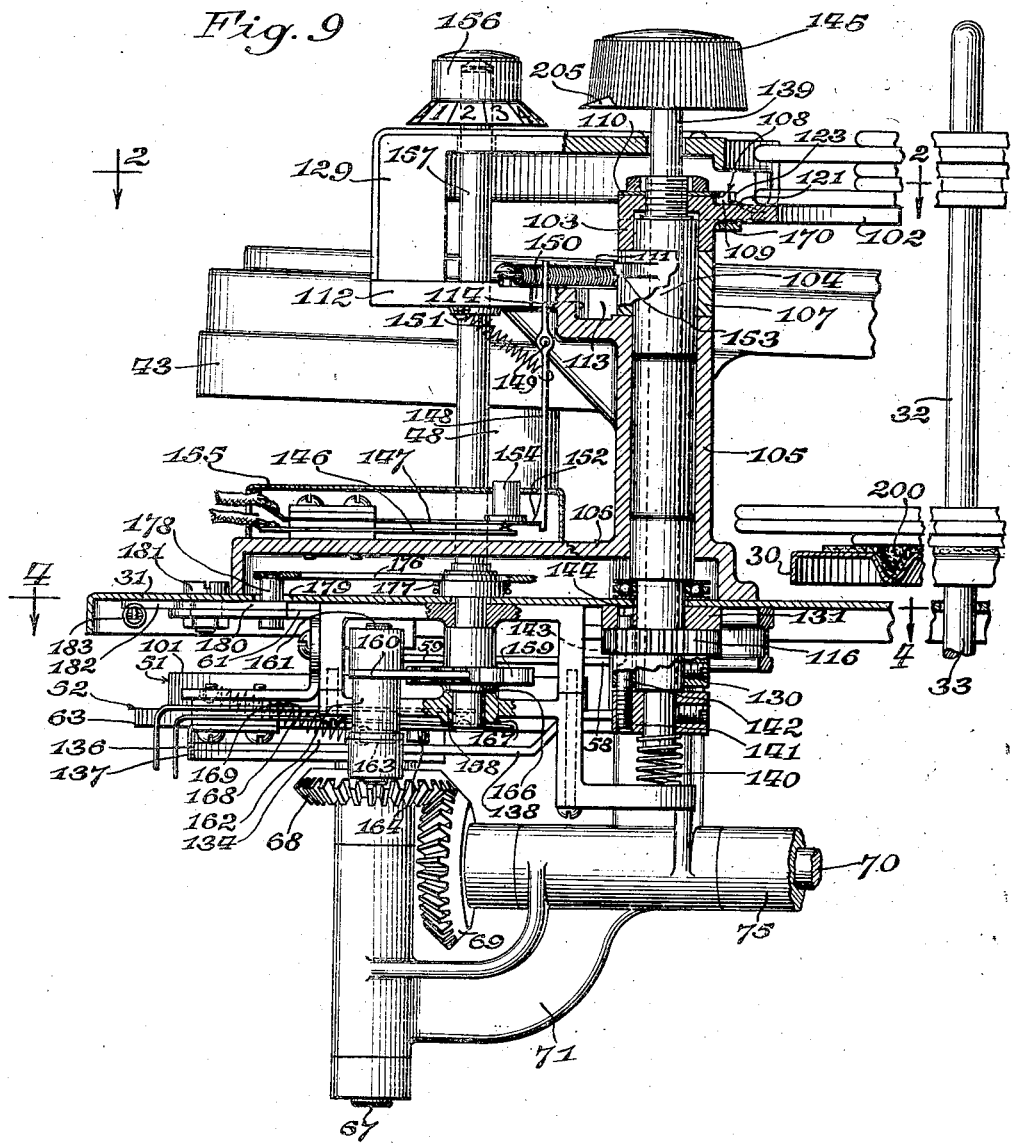

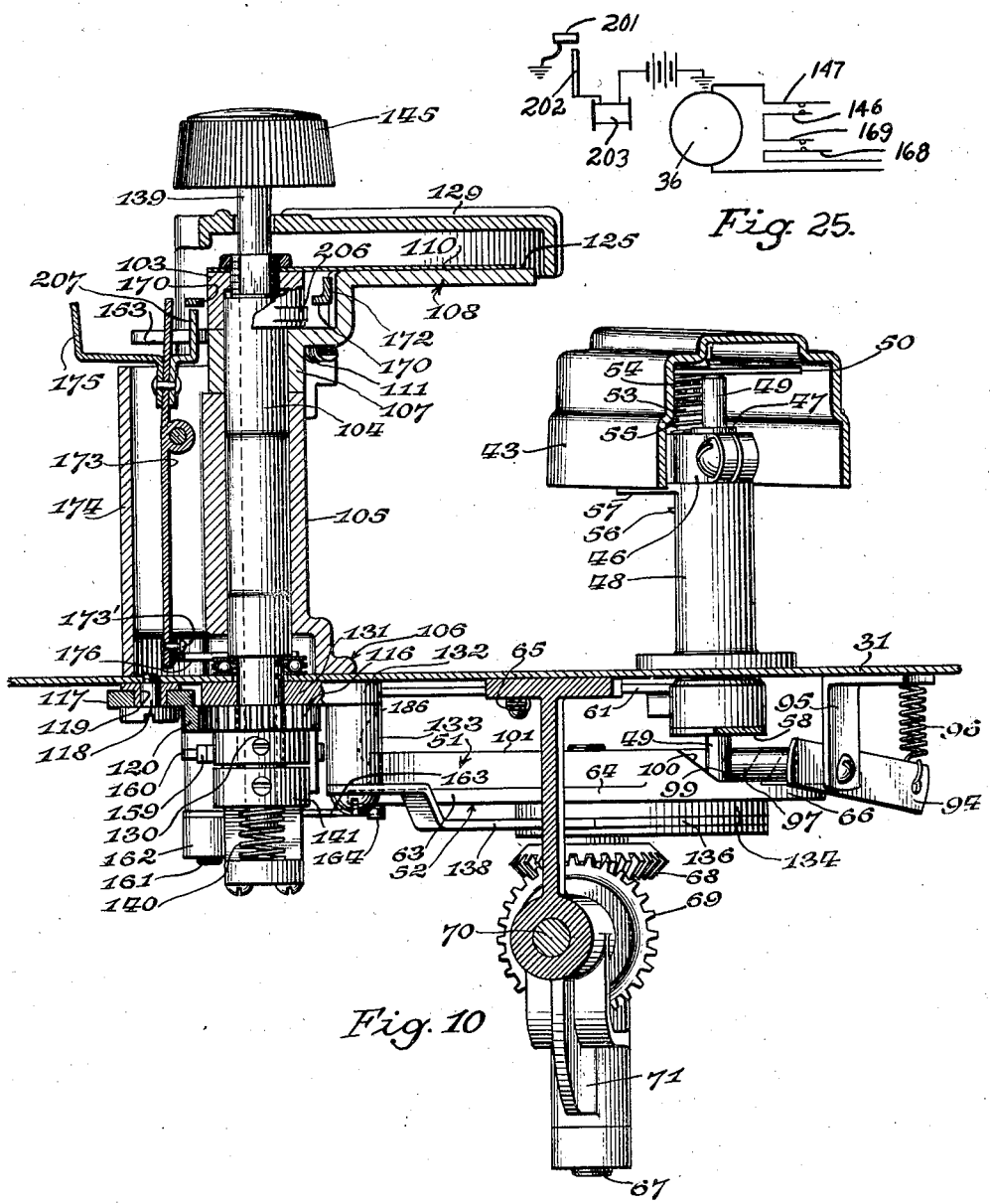

April 9, 1946. C. G. JOHNSON 2,398,010
AUTOMATIC PHONOGRAPH
Filed Jan. 11, 1939 11 Sheets-Sheet 8

Inventor
Carl G. Johnson
By Williams, Bradbury,
McCaleb + Hinkle
Attys.

April 9, 1946. C. G. JOHNSON 2,398,010
AUTOMATIC PHONOGRAPH
Filed Jan. 11, 1939 11 Sheets-Sheet 9
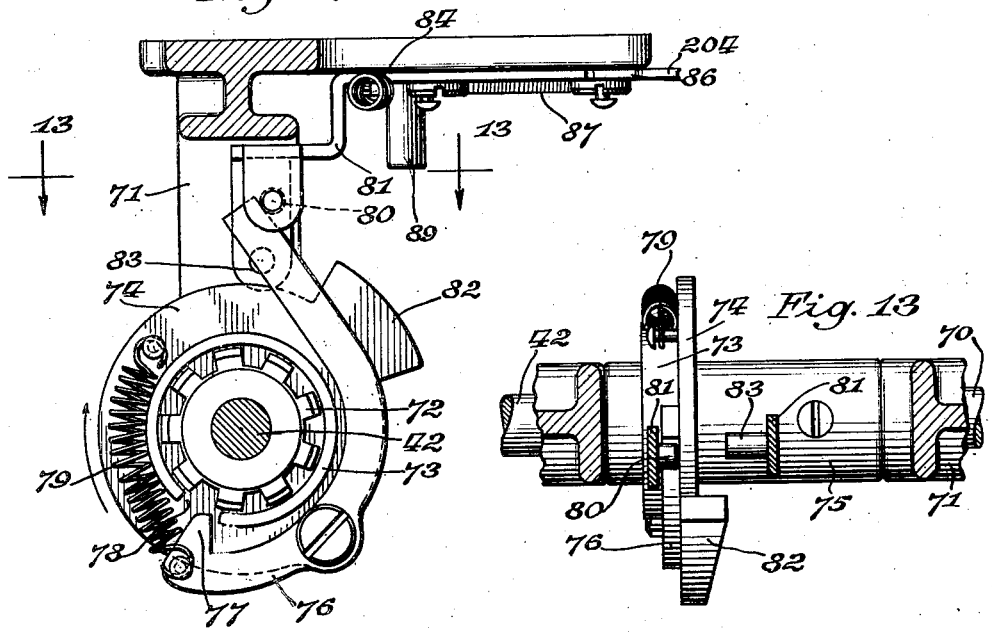
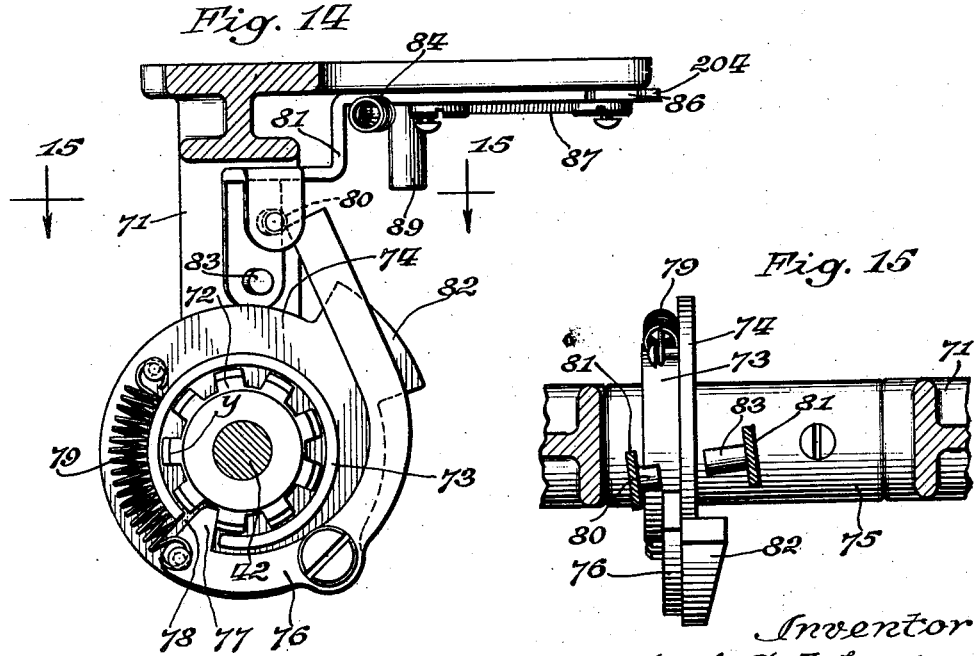
Inventor
Carl G. Johnson
By Williams, Bradbury, McCaleb & Hinkle
Attys.

April 9, 1946.                C. G. JOHNSON                2,398,010
                        AUTOMATIC PHONOGRAPH
            Filed Jan. 11, 1939           11 Sheets-Sheet 10

Inventor
Carl G. Johnson
By Williams, Bradbury, McCaleb & Hinkle
Attys.

April 9, 1946.    C. G. JOHNSON    2,398,010
AUTOMATIC PHONOGRAPH
Filed Jan. 11, 1939    11 Sheets-Sheet 11
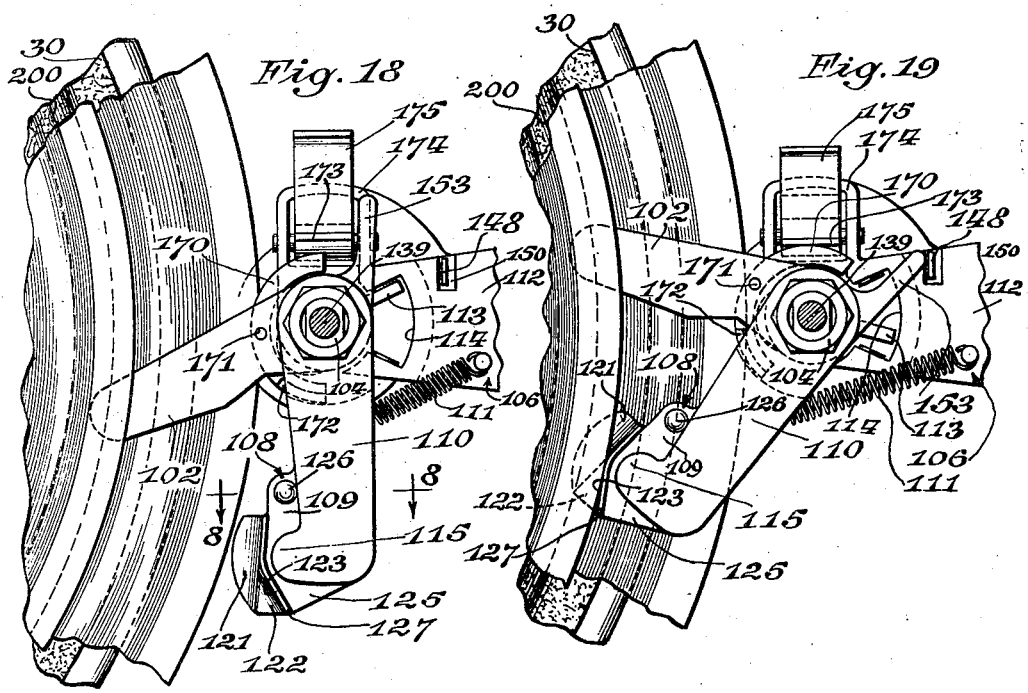
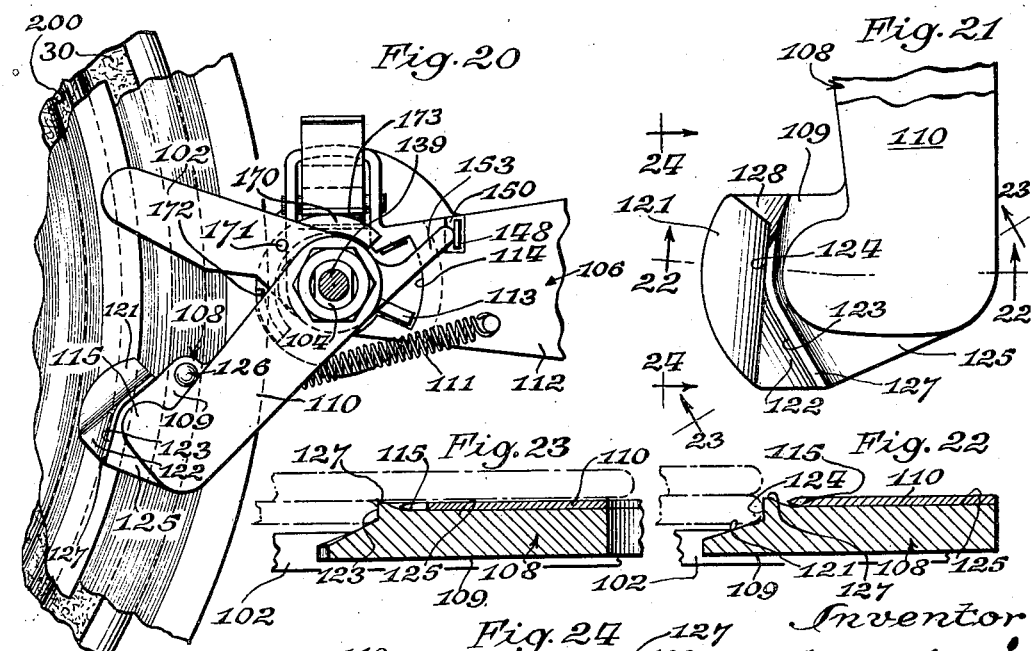

Patented Apr. 9, 1946

2,398,010

UNITED STATES PATENT OFFICE 2,398,010

AUTOMATIC PHONOGRAPH

Carl G. Johnson, Chicago, Ill., assignor to J. P. Seeburg Corporation, Chicago, Ill., a corporation of Illinois Application January 11, 1939, Serial No. 250,311

18 Claims. (Cl. 274—10)

This invention relates to automatic phonographs which are adapted to play a plurality of records, one after the other, without intermediate manual manipulation or adjustment.

In the preferred embodiment of the invention means are provided whereby a plurality of records may be supported above a turntable, onto which they are dropped and played in succession.

One of the objects of the invention is to provide an improved phonograph of this type.

In phonographs of this type the records are supported above the turntable by means of supports, one or more of which are movable to release the lowermost record so that it may drop on the table. Associated with each movable support is another movable support which enters between the lowermost record and the records thereabove so as to prevent the last mentioned records from dropping onto the table when the lowermost record falls. Considerable difficulty has been experienced since the second movable support is frequently out of alignment with the plane of contact between the two lowermost records. This difficulty is frequently exaggerated owing to certain of the records being warped. This difficulty is also accentuated when the moving supports are adapted to operate with records of different diameters, such as the conventional 10" and 12" records, because the point of contact of the second movable support with the stack of records must, in such machines, be located at a substantial distance from the point of support provided by the first movable support.

The present invention has for one of its objects to remove these difficulties.

When a phonograph of this type is adapted to play 10" and 12" records, a problem is presented in that the 12" records are normally definitely thicker than the 10" records.

A further object of the invention is to provide means whereby the records are located so that the second movable support is located substantially at the upper surface of the lowermost record, when it is about to enter the stack of records, irrespective of whether the lowermost record is a 10" or 12" record.

A further object of the invention is to provide a simple means whereby the phonograph may be set for the playing of a certain desired number of records.

A further object of the invention is to provide simple means whereby the phonograph mechanism is automatically stopped when all the records have been played.

Other objects, advantages and capabilities of the invention will appear from the following description of a preferred embodiment thereof, taken in conjunction with the accompanying drawings, in which:

Fig. 4 is a sectional detail plan view taken on the line 4—4 of Fig. 9, showing the main cam and associated elements in the position they occupy at the end of the playing of a 12" record;

Fig. 5 is a similar view showing the elements in the position they occupy after the machine has stopped, the elements associated with the cam being set for the playing of a 10" record;

Fig. 6 is a plan view on a larger scale, showing one pair of movable supporting arms in the position they occupy during the playing of a 10" record;

Fig. 7 is a similar view showing the arms in record dropping position after a 12" record has been dropped;

Fig. 8 is a sectional detail taken on the line 8—8 of Fig. 18, showing the normal relation between one of the movable supporting arms and its follower member;

Fig. 9 is a sectional detail view taken on the line 9—9 of Fig. 2, showing the special control mechanism associated with one of the pairs of movable arms;

Fig. 10 is a vertical sectional view taken on the line 10—10 of Fig. 2, showing other portions of the mechanism shown in Fig. 9;

Fig. 12 is a fragmentary sectional view taken on the line 12—12 of Fig. 4, showing the clutch in elevation and in the relation it occupies during the playing of a record;

Fig. 13 is a sectional plan view of the clutch mechanism taken on the line 13—13 of Fig. 12;

Fig. 14 is a sectional view similar to Fig. 12, showing the clutch in its clutched relation during record-changing operation;

Fig. 15 is a sectional plan view taken on the line 15—15 of Fig. 14, showing the elements of Fig. 13 in the position they occupy when the clutch is engaged;

Fig. 18 is a plan view corresponding to Figs.

Figure 1:
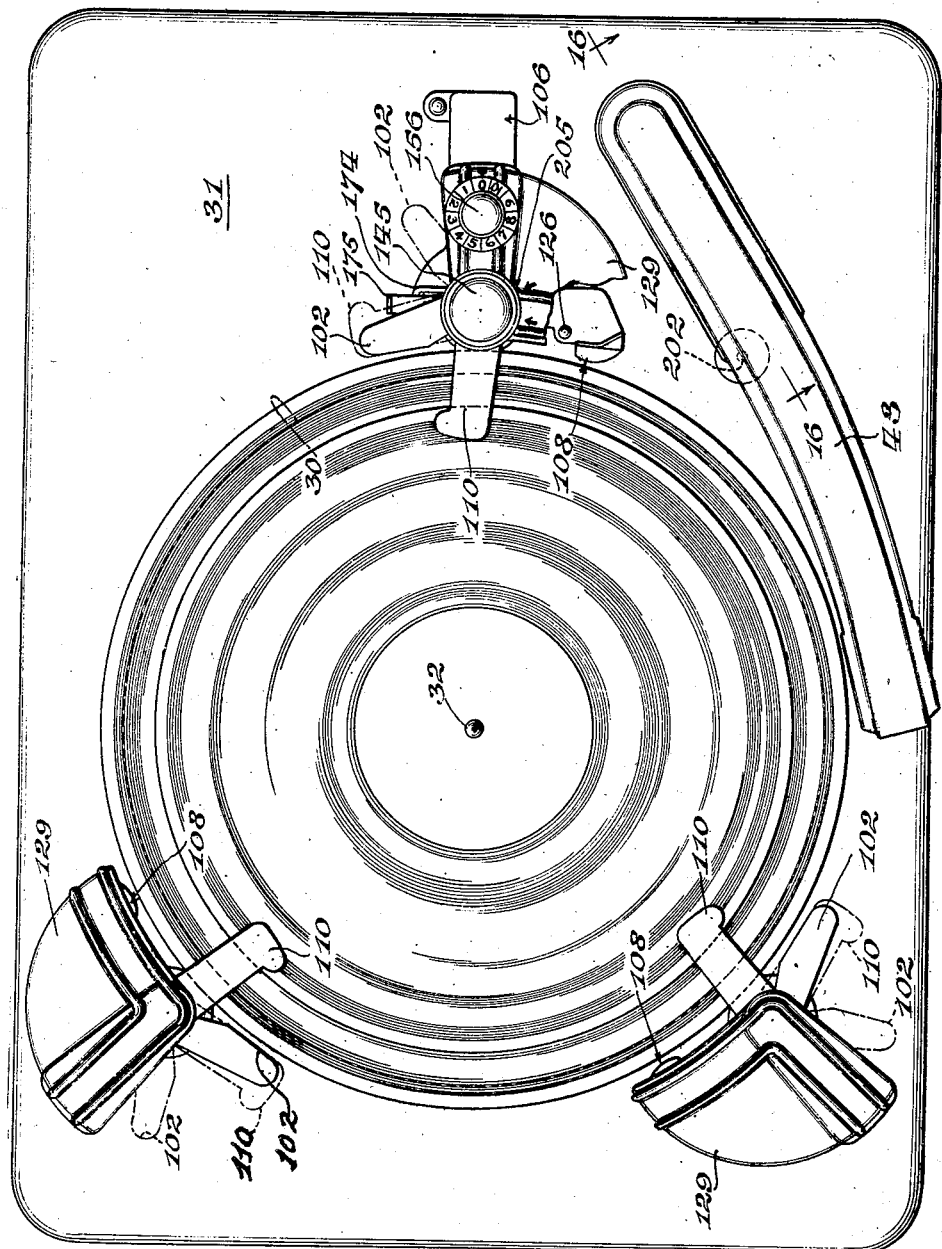
Figure 1 is a plan view of a phonograph embodying my invention, the supporting arms being shown in the manner they are located when all the records have been played.

6 and 7, showing the arms in the playing position for a 12" record;

Fig. 19 is a similar view showing the manner in which the follower of the second arm engages a 10" record prior to the dropping of the record;

Fig. 20 is a similar view showing the manner in which a switch is actuated to stop the operation of the machine when no record remains in the magazine;

Fig. 21 is a fragmentary plan view of a modified second movable arm and a modified follower, the record engaging portions of the follower being shown in detail;

Fig. 22 is a sectional view taken on the line 22—22 of Fig. 21, showing the follower of Fig. 21 in engagement with the lowermost 12" record and the second arm being about to enter the magazine above that record;

Fig. 23 is a sectional view taken on the line 23—23 of Fig. 21, showing the follower of Fig. 21 in engagement with the lowermost 10" record and the second arm being about to enter the magazine above that record;

Fig. 24 is an elevational view of the end of the follower shown in Fig. 21, as viewed on the line 24—24 of Fig. 21; and Fig. 25 is a wiring diagram.

Referring to the drawings, the phonograph comprises a turntable 30 which is rotatable above a motor board 31. The turntable is provided with an elongated center pin 32 which extends from the turntable upwardly through the magazine position of the records which are to be played. The turntable is mounted on the vertical shaft 33 which extends through the motor board 31 and is mounted in suitable bearings on a frame 34. This frame is suspended by means of springs 35 from the motor board 31.

The shaft 33 is driven by a motor 36 which is carried by the frame 34. This shaft carries a worm 37 which meshes with a worm gear 38. The worm gear 38 is rigidly mounted on a shaft 39 mounted on bearings on the frame 34. The shaft 39 rigidly carries a slotted arm 40 which is adapted to receive within its slot a crank pin 41 which is rigidly mounted on a shaft 42. The shaft 42 is normally in substantial alignment with the shaft 39, but the operative connection between them is sufficiently articulated to enable the frame 34 to move resiliently when subjected to shocks and vibrations.

The tone arm 43 is mounted above the motor board 31 so as to play the records which are dropped upon the turntable 30. The tone arm 43, which is provided with a pick-up and needle of any suitable kind, may suitably comprise an inverted channel member. Near the end remote from the pick-up the tone arm is pivotally mounted on a horizontal axis, for example, by a pin 44 to a bracket 46. This bracket is rigidly mounted on the upper end of a sleeve 47 which is rotatably mounted within a hollow standard 48 so as to provide the vertical axis about which the tone arm revolves as it moves across the face of the record.

The standard 48 is mounted on the motor board 31. It will be noted that the pivot 44 is more remote from the pick-up end than is the sleeve 47. Through the sleeve 47 extends a rod 49 which is normally in engagement with a plate 50 rigidly carried within the tone arm 43. The rod 49 rests upon a cam track 51 on the main cam wheel 52. It will readily be understood that when the rod 49 is elevated by the cam track 51, the needle will be raised away from the record or records on the turntable and that when the cam track 51 permits the tone arm to move downwardly, the needle engages the topmost record on the turntable.

The bracket 46 is provided with a boss 53 in which slides a vertical bolt 54. A compression spring 55 is mounted around the upper portion of the boss 53 and its upper end is connected to the upper end of the bolt 54. The bolt 54 is provided with a relatively large head 56 which underlies a flange 57 on the standard 48. The spring 55 normally opposes the weight of the tone arm so that the appropriate pressure is applied upon the needle during playing. When, however, the tone arm is elevated by the rod 49, the plate 50 moves away from the upper ends of the spring 55 and the bolt 54, and the compression of the spring is then applied by the head 56 of the bolt 54 upon the flange 57. This engagement provides a certain amount of friction which opposes translational movement of the elevated tone arm so that it does not overrun when manipulated by the means hereinafter described.

At its lower end the sleeve 47 rigidly carries two arms 58 and 59. The arm 59 carries an upstanding pin 60 which is adapted to engage the downwardly turned end of a lever 61. The purpose of this lever will be hereinafter described. It is sufficient to mention here that it serves to return the tone arm to initial position for a 10" or for a 12" record.

The arm 58 carries a depending pin 62 which is adapted to cooperate with a peripheral cam 63 on the main cam member 52. The cam member 52 rotates in counter-clockwise direction as viewed in Figs. 4 and 5. It will readily be understood that when the rise 64 of the cam 63 moves past the pin 62, that pin will be carried outwardly, swinging the arms 58 and 59 into the position they occupy in Fig. 5. When this position is attained the pin 60 swings the lever 61 in clockwise direction against the action of the strong spring 65. When the cam member 52 has almost completed one revolution, the cam fall 66 moves past the pin 62 and the lever 61 is moved by the spring 65 so as to spring the arm 59 into position for locating the tone arm into initial playing position for a 10" record or for a 12" record. The manner in which the movement of lever 61 is regulated will be hereinafter more fully described.

The cam member 52 is rigidly mounted on a vertical shaft 67, upon which is also rigidly mounted a bevel gear 68. The bevel gear meshes with a bevel gear 69 which is rigidly mounted on a shaft 70. The shafts 67 and 70 are supported by bearings in a frame 71 carried on the underside of the motor board 31. The frame 71 also carries the shaft 42 which is arranged in alignment with the shaft 70. The shaft 42 is driven continuously by the motor 36. In order to provide for the intermittent rotation of the main cam 52, the shafts 42 and 70 are provided with clutch mechanism which will now be described.

Figure 11:
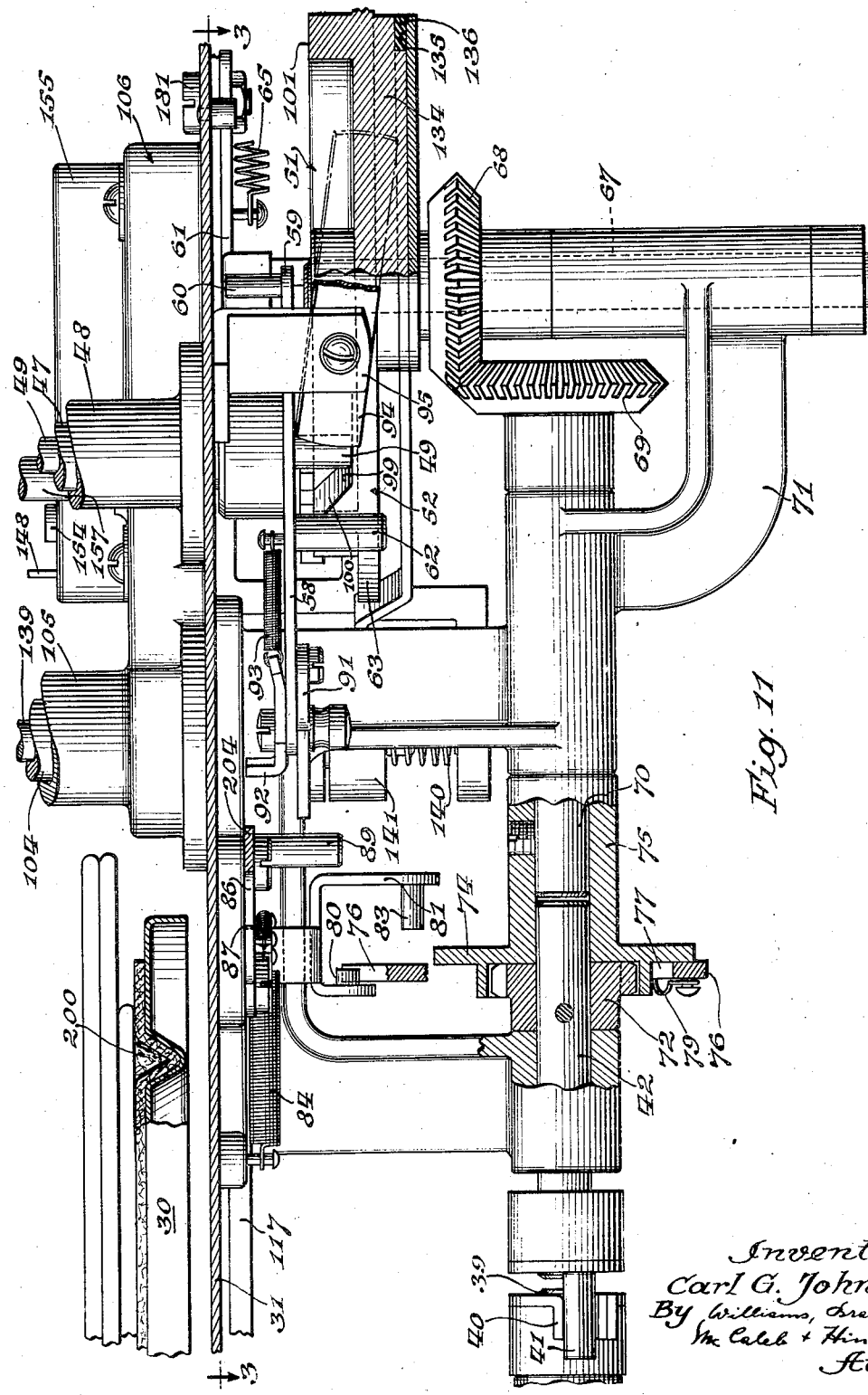
Fig. 11 is a fragmentary sectional view taken on the line 11—11 of Fig. 3, showing a portion of the drive mechanism below the motor board.

The clutch mechanism is best illustrated in Figs. 11 to 15, inclusive. The shaft 42 has rigidly mounted thereon a spur wheel 72, the teeth of which are located within a circular flange 73 which projects laterally from a disc 74. The disc 74 is integral with a hub 75 which is rigidly mounted on a shaft 70. The shaft 42 may conveniently project into the hub 75, as shown in Fig. 11. A dog 76 is pivotally mounted on the disc 74 and is provided with a detent 77 at one end which is adapted to project through a gap 78 in the flange 73 so as to engage one of the teeth of the wheel 72, as best seen in Fig. 14.

The dog 76 is biased towards its wheel engaging position by means of a spring 79. The other end of the dog 76, that is, the end remote from the detent 77, is relatively long and projects beyond the disc 74. This projecting end of the dog is adapted to be engaged and arrested by a pin 80 which is carried by a lever 81. The spur wheel 72 is driven in the clockwise direction, as viewed in Figs. 12 and 14, by the motor. Consequently, when the dog 76 is engaged with the wheel 72 it is carried in the same direction. When the pin 80 is moved into dog-engaging position it engages the projecting end of the dog, with the result that the detent 77 is withdrawn from the wheel 72 and the drive of the disc 74 is arrested. This drive is not resumed until the pin 80 is displaced from its position shown in Fig. 13 to its position shown in Fig. 15.

The disc 74 carries a cam member 82 which is adapted to cooperate with a pin 83 also carried by the lever 81. The pins 80 and 83 are so located that the cam 82 cooperating with the pin 83 throws the lever 81 into position to locate the pin 80 in dog-engaging position. Conversely, the movement of the dog 80 out of dog-engaging position brings the pin 83 into the position shown in Fig. 15 so that it is engaged and actuated by the cam 82 as the disc 74 moves towards its position of arrestment, which is shown in Fig. 12.

The lever 81 is pivotally mounted on the motor board and at one end it is provided with two depending arms upon which the pins 80 and 83 are mounted. The lever 81 is biased towards the position shown in Fig. 4, which corresponds to the position shown in Figs. 14 and 15, by means of a spring 84. When in this position it abuts against a stop 85. This stop also serves as an abutment for a latch lever 86 which is biased towards latching position by means of a spring 87. It will readily be understood from Figs. 4 and 5 that when the lever 81 is rotated slightly in clockwise direction as viewed in these figures, the latch 86 will move towards the stop 85 and will hold the lever 81 in position corresponding to Figs. 12 and 13. This movement is effected by the cam member 82 on the disc 74, as has been previously described.

The latch 86 is constituted by one arm of a bell crank lever, the other arm 88 of which carries a downwardly extending pin 89. The arm 88 also carries a member 90 having a serrated edge. The arm 58 which moves with the translational movement of the tone arm rigidly and adjustably carries an abutment 91. This abutment is so arranged that when the tone arm moves to a position sufficiently near the center of the turntable, the abutment 91 engages the pin 89 and swings the bell crank lever 86—88 into unlatching position, whereupon the lever 81 and the pins 80 and 83 move from their position shown in Fig. 13 into their position shown in Fig. 15. Consequently, the dog 76 is released and its detent 77 moves from the position shown in Fig. 12 into the position shown in Fig. 14. Consequently, the main cam 52 is driven for one revolution. When the end of that revolution approaches, the cam 82 swings the lever 81 into the position shown in Figs. 3, 11, 12 and 13, this lever being latched in this position by the latch 86. The pin 80 now engages the dog 76 and moves it out of engagement with the wheel 72 in the manner illustrated in Fig. 12. Therefore, the main cam 52 remains inoperative until the latch 86 is again moved into the unlatching position shown in Figs. 4 and 5.

In order to effect the unlatching by records having an eccentric end groove which does not extend towards the center of the record far enough to bring the abutment 91 into engagement with the pin 89, I have provided the serrated member 90 on the arm 88. The serrated member 90 is adapted to be engaged by a dog 92 which is pivotally mounted on the arm 58. The dog 92 has a sharp point which is adapted to be biased lightly towards the serrated member 90 by a light spring 93. It will readily be understood with reference to Fig. 4, that when the arm 58 moves in the clockwise direction the dog 92 will slip over the serrated member 90. When, however, the arm 58 moves in the counterclockwise direction, the latch 86 will be rotated in counterclockwise direction and the lever 81 will be released so that the clutch engages and the cam member 52 is rotated for a single revolution. It will, of course, be understood that this counterclockwise movement of the arm 58 occurs whenever the needle runs into an eccentric end groove after a record has been played.

In order to insure the stoppage of the main cam 52 at proper position, I provide an arm 94 pivotally mounted on a bracket 95 on the under side of the motor board 31. One end of this arm is biased upwardly by means of a spring 96. The other end carries a projecting pin 97 which is adapted to bear upon the upper face of the cam track 51. The dog 76 is adapted to be withdrawn from the teeth of the wheel 72 when the pin 49 has reached the bottom of the fall 98 of the cam track 51, and is supported by the lower dwell 99. Consequently, the tone arm is not elevated by the pin 49 and it may cooperate with the record for reproduction in the usual manner.

In this position of the cam member 52, that is, the playing position, the pin 62 is located between the rise 64 and the fall 66 on the lateral cam member 63, so that the tone arm is free to move over the face of the record during playing. The pin 97, being pressed downwardly on the fall 98 when the clutch is disengaged, cooperates with the inclined surface of the fall 98 to bring the cam member 52 into exact position.

When the clutch is engaged, in the manner previously described, and the rotation of the main cam member 52 begins, the lower end of the pin 49 moves up over a cam raise 100 and for the greater part of the revolution it is held at a relatively high location by means of the elevated dwell 101 on the cam track 51. Consequently, the tone arm is elevated away from the record and remains away until after a new record has been deposited on the turntable and the tone arm has been brought to initial playing position. Immediately after the pin 49 is raised by the cam raise 100, the pin 62 is engaged by the cam raise 64 and the elevated tone arm is swung back clear of the records so that it does not interrupt the falling of the larger size of record onto the turntable.

When the machine is loaded for the playing of a plurality of records, a single record is placed upon the turntable 30 and a plurality of records are loaded upon arms 110 which are mounted above the turntable so as to extend over the playing position of records of both sizes, as shown in Fig. 1. As previously pointed out, the center pin 32 extends upwardly through the records thus located so that they are maintained in axial alignment with the turntable 30.

In the present embodiment of the invention the records which are to be played are carried on three arms 102 or on three associated arms 110. It must be understood, however, that any desired number of supports may be provided. Each arm 102 is rigidly mounted by means of a boss 103 upon the upper threaded end of a sleeve 104. This upper end of the sleeve 104 is provided with flat faces and the boss 103 and the mounted end of the arm 110 are provided with openings conforming to the shape of the upper end as shown in Figs. 9 and 10, so that they are maintained rigidly mounted upon the sleeve 104 by a nut on the upper end of said sleeve. The sleeve 104 is rotatably mounted in a standard 105 which may suitably form part of a casting 106 which is mounted on the motor board 31.

The three supports are in effect record escapement means and are similar in construction and operation and, consequently, only one will be described, being that one on the right-hand side of Fig. 1. This particular support is associated with certain additional mechanism which will hereinafter be described. As first described, the support means hereinafter described with reference to Figs. 9 and 10 is common to all the support members.

Below the boss 103 a boss 107 is rotatably mounted on the sleeve 104. This boss has a relatively movable engagement with the upper end of the standard 105 and the lower end of the boss 103. The boss 107 is provided with a relatively thick arm or element 108 which is offset upwardly relative to the boss 107, as best seen in Fig. 10. The arm 108 is provided with a record-engaging head 109 which will be hereinafter more particularly described. It may here be noted, however, that the arm 108 is associated with a record-supporting arm 110 which is a blade member adapted to enter between the lowermost record and the record immediately above it before the associated arm 102 clears the bottommost record. The arms 102 and 110 must, therefore, be sufficiently long to insure the entry of the arm 110 into the stack of records before the associated arm 102 clears the smallest record, as is shown in Fig. 19.

Figure 2:
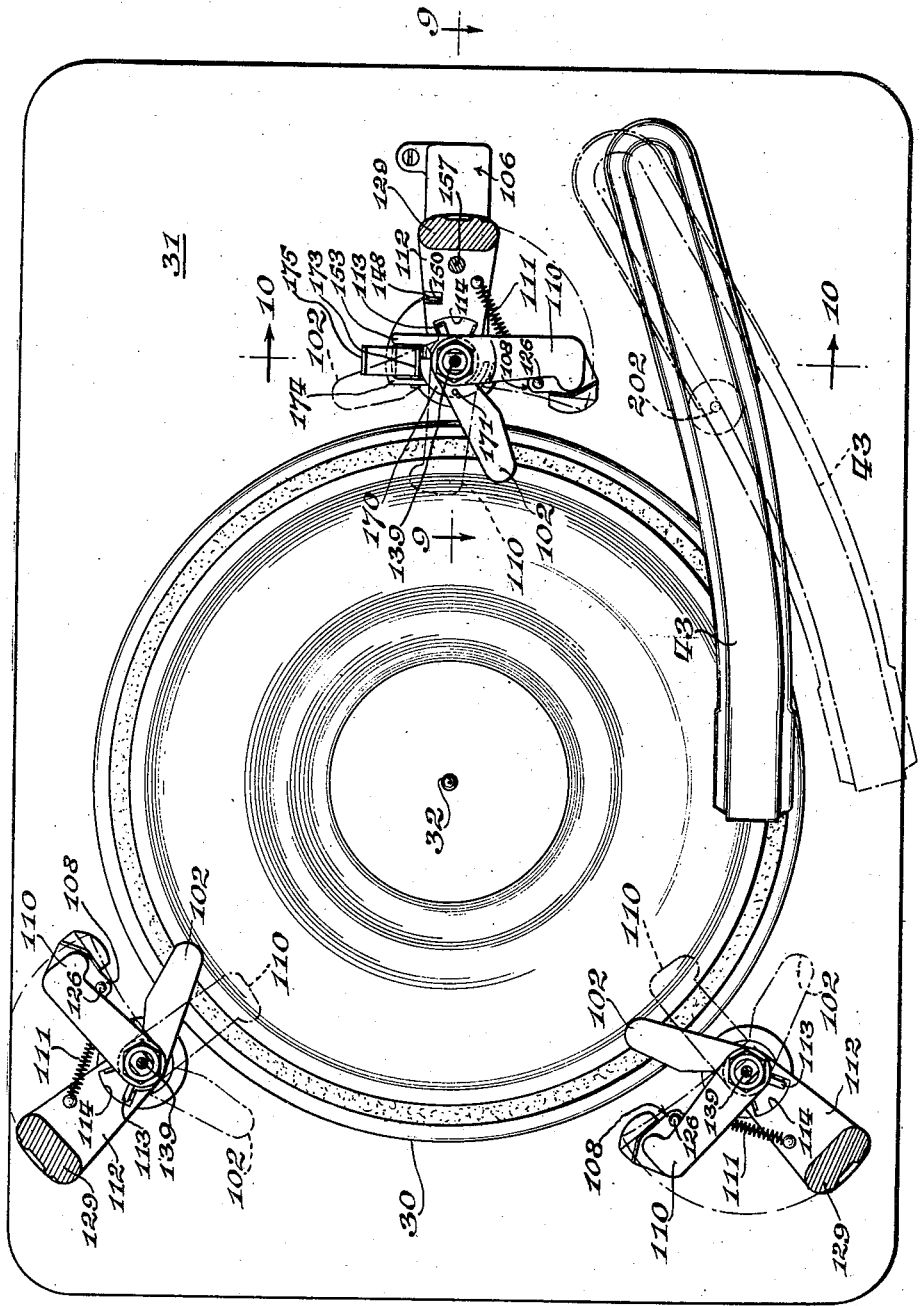
Fig. 2 is a similar view with certain elements associated with the arms removed for the sake of clarity, the arms being shown in normal playing position.

The arm 108 is biased away from the records into the position shown in full lines in Figs. 1 and 2, by means of a spring 111 which is connected to the arm and to a bracket 112 which is integral with the standard 105. The boss 107 carries a radially projecting arm 113 which is adapted to engage stop formations provided on the bracket 112, for example, within a well formation 114 in said bracket. Consequently, the arm 108 normally remains in the position shown in Fig. 1 and may be displaced from that position inwardly so as to come into contact with the lowermost record, be it a larger or a smaller record, and into a still further inward position with reference to the center of the turntable, that position being shown in Fig. 20 and being only attained when no records remain supported above the turntable.

The arm 110, which has a relatively sharp entering portion 115, is located immediately above the arm 108 and it has a drive or frictional connection with the arm 108 so that when the arm 110 moves toward the record to be released, the arm 108 does likewise. When the arm 108 is arrested by contact with the lowermost record, the arm 110 continues to move until it attains the position shown in full lines in Fig. 1. When the arm 110 moves out of contact with the arm 108, that arm is moved back by its spring 111 to its initial position shown in Figs. 1 and 2.

Each sleeve 104 rigidly carries a gear 116 below the motor board 31. These gears are connected by suitable mechanism so that they are oscillated in one direction and in the other direction in unison. This means may suitably comprise a yoke member 117 slidably mounted on the under side of the motor board by means of pins 118 which pass through slots 119 and guide the yoke for straight line reciprocal movement. The yoke member 117 carries three racks 120 which are in mesh with the gears 116. The three gears are thus driven from the record support shown in the right-hand side of Fig. 1. Since the actuating means for this support is individual thereto, description of the same will be deferred until after the functions and operation of the arm 108 have been completely described.

It will be noticed that the arm 108 is relatively thick and that it is in substantial alignment with the arm 102 and extends above that arm to a certain extent, as can be seen in Fig. 9. The head 109 of the arm 108 is provided with two sloping faces 121 and 122. The lower portions of these faces are located at a lower level than the upper surface of the arm 102. The upper portions of these faces are located slightly above the level of the upper surface of the arm 102.

When the lowermost record is a 10" record the face 122 is brought into contact with it, as is shown in Fig. 19. The faces 122 of the three arms 108 cam the stack of records upwardly from their position of support on the arms 102. The manner in which the records are raised is suggested in Fig. 23. The arm 108 is arrested by the engagement of the edge of the lowermost record by the wall 123 adjacent the upper portion of the face 122. The height of this wall is so arranged that the upper surface of the arm 108 is slightly lower than the upper surface of the lowermost record, which is a 10" record. Consequently, when the arm 110 slides over the top of the arm 108, its sharp entering portion 115 will be in alignment with the plane of contact between the lowermost record and the record immediately above it.

When the lowermost record is a 12" record the edge of the record is engaged by the face 121 and the stack of records is raised from the arms 102 in the manner suggested in Fig. 22. At the inner end of the face 121 is provided a wall 124 which is somewhat higher than the wall 123 so that when the arm 110 slips over the top of the arm 108, its entering portion 115 will be very closely in alignment with the plane between the two bottom records in the magazine. The difference in height of the walls 123 and 124 enables the knife-like end 115 of the arm 110 to engage the records precisely, notwithstanding the fact that the 12" records are somewhat thicker than are the 10" records.

As best seen in Figs. 23 and 24, the arm 110 is preferably located in a recess 125 provided on the upper face of the arm 108. Consequently, when the lowermost record is a 10" record and the record immediately above it is a 12" record, as shown in Fig. 23, the arm 110 is introduced safely below it, notwithstanding that the portion projecting over the 10" record is warped downwardly to some degree. When the arm 108 is arrested by the engagement of its wall 123 or 124 with the edge of the lowermost record, the arm 110, continuing to move inwardly, rises out of the recess 125 and passes over the upper edge of the arm 108 in between the two bottom records.

As shown in Figs. 7, 8, 18 and 19, I may mount a ball 126 so that it projects into alignment with the bottom of the recess 125 and to a position substantially corresponding to the uppermost edge of the arm 108. The ball 126 serves as a cam to elevate the arm 110 out of the recess 125 when the arm 108 is arrested by the lowermost record. The ball 126 also serves as a cam for aiding the arm 110 to pass over the uppermost edge 127 of the arm 108 when the arm 110 returns to its normal position. It will be understood that when the arm 110 moves into the stack of records and away from the arm 108, the latter arm, being freed from frictional engagement with the arm 110, snaps back into its initial position under the influence of the spring 111.

If desired, the ball 126 may be omitted, in which case the arm 110 is elevated out of the recess 125 by the curved or cam formation of this recess, as can be seen in Figs. 23 and 24. When the arm 110 moves back to its initial position, that is, the position as shown in full lines in Figs. 2 and 6, it approaches the normal position of the arm 108, which normal position is defined by the engagement of the projection 113 with the stop at one end of the well 114, as shown in Figs. 6, 7 and 18. The arm 110, being forced back to normal position, is elevated over the ball 126. If this ball is omitted, as is illustrated in Fig. 21, the arm 108 is preferably provided with a sloping face 128, which effects the elevation of the returning arm 110 over the uppermost edge of the arm 108.

Cover members 129 are preferably provided on each record support. These cover members are carried by the brackets 112 and are arranged to overlie the arm 108 and the arm 110 in their normal position, which position is shown in full lines in Fig. 2. Since the arms 110 are usually obscured by the stack of records in the magazine, the record changing arms are relatively concealed and do not impair the appearance of the machine.

The mechanism now to be described is associated with one of the magazine supporting members only, being that supporting member shown to the right in Fig. 1 and illustrated in Figs. 9 and 10. The gear 116 of this supporting element is rigidly mounted on the sleeve 104 by means of a set screw 130 which extends through its hub. Between the gear 116 and the motor board 31 is mounted a hub 131 through which the sleeve 104 extends freely.

Figure 16:
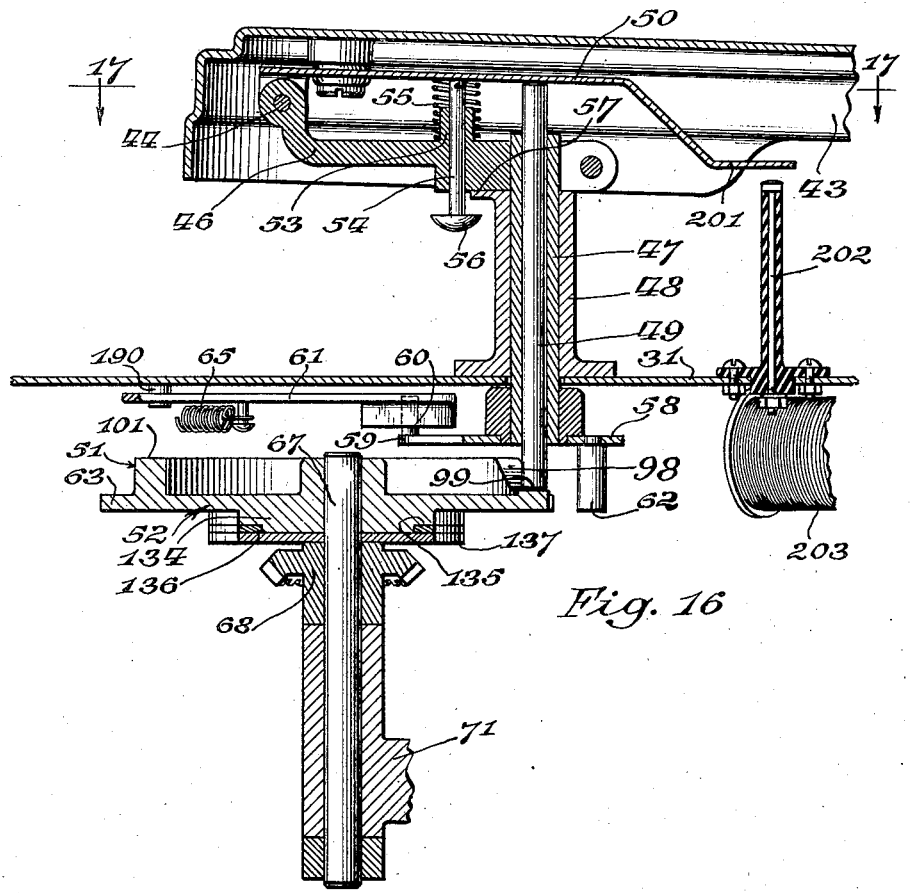
Fig. 16 is a fragmentary sectional elevation taken on the line 16—16 of Fig. 1, showing the manner in which the tone arm is mounted and actuated.
Figure 17:
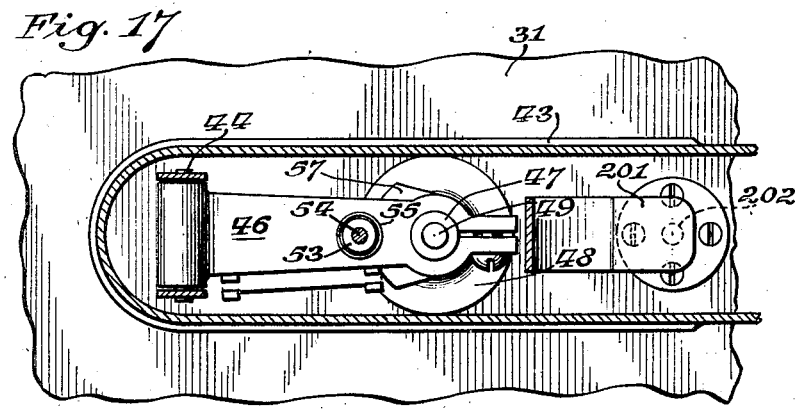
Fig. 17 is a sectional plan view taken on the line 17—17 of Fig. 16.

In the other supporting members the hub 131 is merely a spacer. In this particular supporting member the hub 131 is, in effect, the hub of an arm 132 which includes a downwardly extending portion 133 (Fig. 10). Upon the under side of the main cam member 52 is provided an eccentric 134. This eccentric receives in a shouldered recess 135 an eccentric ring 136. This ring is maintained in position by means of a plate 137 secured to the lower face of the eccentric member 134, as shown in Fig. 16. The eccentric ring 136 is integral with an arm 138 which is pivotally mounted to the downwardly directed element 133 of the arm 132. It will readily be understood from Fig. 3 that each time the main cam member 52 rotates in the counter-clockwise direction the arm 132 is oscillated first in clockwise and then in counter-clockwise direction. The arms 102 and 110 are consequently oscillated from the full line position shown in Fig. 2 into the dotted line position shown in that figure and then they return to their full line position, discharging the lowermost record onto the stack each time they are thus operated.

Means are provided whereby the arms 102 and 110 may be moved out of alignment with the records on the turntable to enable the same to be unloaded. Thus, the supporting members shown in Figs. 9 and 10 are provided with a shaft 139 which slidably extends through the sleeve 104. This shaft is biased upwardly by a spring 140 which engages a collar 141 keyed to the lower end of the shaft 139. This collar 141 rigidly carries an upstanding pin 142. This pin normally extends through an opening 143 in the gear 116 and terminates within an opening 144 in the hub 131, normally connecting the hub 131 rigidly to the gear 116 and the sleeve 104.

The upper end of the shaft 139 extends through and beyond the cover 129 and its upper end is provided with an actuating knob 145. When the knob 145 is moved downwardly, the pin 142 is withdrawn out of the opening 144 in the hub 131. The handle 145 may now be turned to rotate the pinion 116 and also the other pinions 116 to move the arms 102 and 110 simultaneously into desired position. In this way these arms may be moved into their dot-and-dash positions shown in Fig. 1, and it will readily be understood that all the records may be removed vertically from the turntable. To reset the arms 102 and 110 for the reception of records, the knob 145 is rotated in the opposite direction until the pin 142 is brought into alignment with the opening 144, whereupon the spring 140 moves the shaft 139 upwardly into the position shown in Fig. 9.

Also associated with the record supporting means shown in Figs. 9 and 10 is a switch which automatically stops the motor whenever the last record has been played. This switch comprises two contact leaves 146 and 147, the upper leaf 147 being normally biased away from the leaf 146. These leaves are located in the circuit of the motor. The leaf 147 is adapted to be maintained in contact with the leaf 146 by means of a latch 148. This latch is pivotally mounted at 149 on the bracket 112 and its upper end extends through an opening 150 in the bracket 112.

The latch 148 is biased towards latching position by means of a spring 151 and it is provided with a detent 152 at its lower end to enable it to engage the upper face of the leaf 147 to hold it in engagement with the leaf 146. The boss 107 is provided with a projecting arm 153. As best seen in Fig. 19, the arm 153 does not make contact with the latch 148 even when the arm 108 moves into position to engage a 10" record. When, however, no record remains upon the turntable, the arm 108 is enabled to move into its extreme position shown in Fig. 20 and in this case the arm 153 displaces the latch lever 148 so as to remove the detent 152 out of engagement with the leaf 147. This leaf promptly springs upwardly and the motor circuit is broken until it is again reset by means of a button 154 carried by the leaf 147 and projecting out of a housing 155 in which the leaves 146 and 147 are enclosed.

Means are also provided whereby the phonograph may be set for the automatic and consecutive playing of a definite number of records. This means may suitably be associated with the record supporting mechanism shown in Figs. 9 and 10. It may comprise a knob 156 which is rigidly carried by a shaft 157. The shaft 157 extends through the cover 129, through the bracket 112, through the base of the standard 105 and through the motor board 31. Its lower end is supported in a bearing 158 which is rigidly mounted on the frame 71.

Above the bearing 158 the shaft 157 rigidly carries an escapement wheel 159. The escapement wheel 159 is adapted to cooperate with an escapement member 160 which is rigidly mounted on a shaft 161. The shaft 161 is pivotally mounted in a bearing 162 supported from the frame 71. At its lower end the shaft 161 has rigidly mounted thereon the boss of a projecting arm 163. This arm projects beneath the lateral cam 63 of the main cam member 52 into the path of a pin 164 which projects downwardly from said lateral cam.

Figure 3:
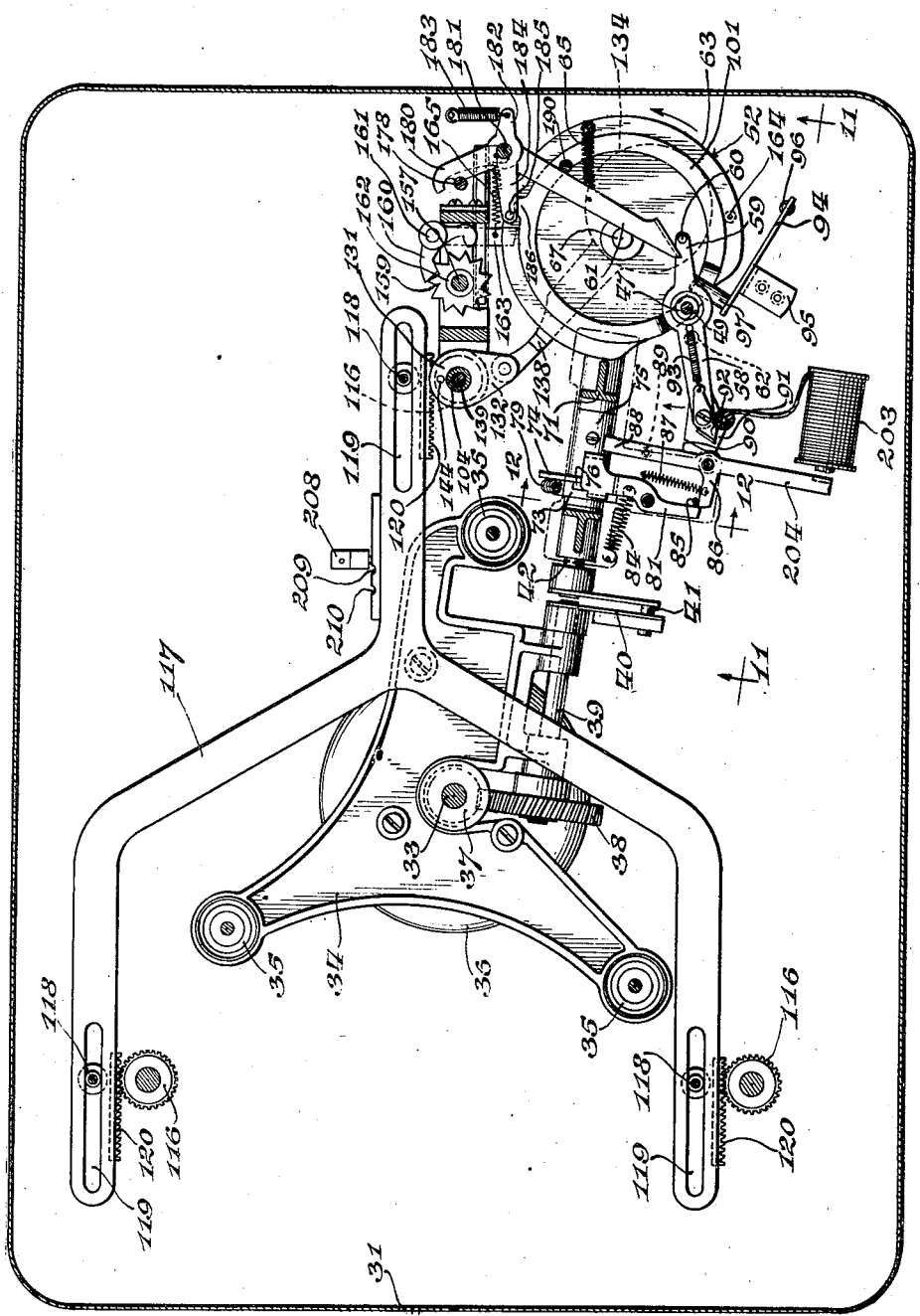
Fig. 3 is a sectional plan view showing the mechanism on the underside of the motor board, the section being taken on the line 3—3 of Figure 11.

The escapement member 160 and the arm 163 which is rigid therewith are biased into the position shown in Fig. 3 by means of a spring 165. It will readily be understood that when the main cam member 52 is approximately at the mid point of its rotation, that is, when the arms 110 are in their full line position as shown in Fig. 1, the pin 164 and spring 165 oscillate the arm 163 and the escapement member 160 to move the escapement wheel 159 the distance corresponding to one tooth in the counter-clockwise direction. The escapement wheel 159 has a small cam member 166 on its under side. When the escapement wheel 159 is in zero position, the cam member 166 engages and depresses a stud 167 carried on the lower leaf 168 of a switch which is constituted by said leaf 168 and an upper leaf 169. These leaves are connected in series with the motor and in series with the leaves 146 and 147. Thus, it will be seen that when the escapement wheel 159 is in one position, the leaf 168 will be depressed out of contact with the leaf 169 and the motor will be stopped.

The knob 156 is provided with a peripheral series of numerals corresponding to the number of records desired to be played. To set the phonograph for the playing of a certain desired number of records, the knob 156 is rotated so as to bring the desired number opposite a mark on the cover 129. After each record is played, the escapement is actuated in the counter-clockwise direction the distance of one tooth and when the desired number of records has been played the escapement wheel 159 has been moved into position to bring the cam member 166 into contact with the pin 167 and separate the switch leaf 168 from the switch leaf 169.

If the knob 156 has been set to correspond to the number of records on the arms 110 or to a lessser number, the leaf 168 will be moved downwardly when that number of records has been played and the machine will be stopped with the arms 110 in the position shown in Fig. 1. If, however, the knob 156 is initially set to a greater number than there are records on the arms 110, the motor will continue to operate until the arm 108 is moved into the position shown in Fig. 20, whereupon the leaf 147 will be released to move upwardly away from the leaf 146.

Means are provided whereby the initial position of the tone arm is automatically regulated for 10" and 12" records. This mechanism is arranged so that the initial position is automatically set for a 10" record except when the lowermost record is a 12" record. This mechanism includes a semi-circular member 170 which is pivotally supported on the under side of the arm 102 of the support mechanism illustrated in Figs. 9 and 10. The member 170 extends around the boss 103 and its internal diameter is somewhat greater than that of the boss so that it may be moved to a certain limited extent about its pivot 171.

The portion of the member 170 which extends beneath the arm 110 is provided with a bearing surface 172 which extends upwardly so that it may engage the periphery of the lowermost record in the event that it is a 12" record. Thus, when the arm 110 is entering the stack above the lowermost record, the projection 172 is engaged by that record if it is a 12" record, with the result that the member 170 is swung in counter-clockwise direction about its pivot 171, and the extremity of the member 170 remote from the surface 172 is moved outwardly so as to move the upper end of a lever 173 outwardly from its normal position shown in Fig. 10. The lever 173 is pivotally mounted on a housing 174 located adjacent the standard 105.

The upper end of the lever 173 is provided with a manually operable handle 175 whereby the same displacement of the lever 173 may be effected by hand. The lower end of the lever 173 is operatively connected to one end of a lever 176 by means of a rivet 173' which provides sufficient room for the free movement of the lever 176 about its pivot. The lever 176 is pivotally mounted on the shaft 157 above the motor board 31, Figs. 5 and 10.

The lever 176 is biased by a spring 177 against the lower end of the lever 173 so that the upper end of that lever is normally biased inwardly. The end of the lever 176 remote from that engaged by the lever 173 is provided with a pin 178 which extends downwardly through an opening 179 in the motor board 31. This pin is adapted to be engaged by one arm 180 of a three-arm member which is pivotally mounted on a screw 181 which also serves as a pivot for the lever 81.

The three-arm member comprises an arm 182 which is connected to a spring 183 so directed to bias the arm 180 against the pin 178. The third arm 184 of the three-arm member carries a pin 185 which is adapted to be actuated by a small cam or hump 186 formed on the exterior of the cam track 51. As best seen in Figure 4, the hump 186 is located quite close to the pin 185 during the playing of a record, that is, when the main cam member 52 is at rest. Immediately the cam 52 goes into operation, the hump 186 displaces the pin 185 outwardly and the three-arm member is displaced in the clockwise direction.

The arm 180 is provided with two recesses 187 and 188. It may be here noted that the recess 187 corresponds to the initial playing position of the tone arm for a 12" record and the recess 188 corresponds to the initial playing position for a 10" record. When the arm 180 is displaced to the right as viewed in Figs. 4 and 5 by the hump 186, the spring 177 moves the lever 176 into the position shown in Fig. 5 and it is held in that position when the arm 180 is returned into contact with the pin 178 by the spring 183. Thus it will be understood that just at the beginning of the record changing operation, the pin 178 is set into the 10" initial playing position and to change the adjustment to correspond to a 12" position, the pin 178 must be moved into the recess 187 of the arm 180. This may be done automatically at a later point in the record changing operation, that is, by the engagement of the projection 172 with a 12" record about to be dropped onto the turntable, or by manually moving the handle 175 outwardly. It will also be understood that when the handle 175 is moved inwardly, the pin 178 may be moved out of the recess 187 and into the recess 188 to set the mechanism manually for the playing of a 10″ record. It will be understood that the spring 183 is sufficiently strong to prevent the movement of the pin 178 from the recess 187 to the recess 188.

As has been previously explained, the lateral cam 163 throws the arm 59 in the counter-clockwise direction, as viewed in Figs. 4 and 5, at an early stage in the record changing operation. This occurs immediately after the hump 186 has set the pin 178 into the 10″ initial playing position and it effects the displacement of the lever 61 away from the pin 178, as is shown in Fig. 5. When the pin 62 rides down the fall 66 on the lateral cam 63, the spring 65 swings the lever 61 so as to return the tone arm to initial playing position.

If the pin 178 is located in the 12″ playing position, as is shown in Fig. 4, the end of the lever 61 is moved so that an abutment 191 engages the pin 178, as shown in Fig. 4, and the lever 61 moves to the 12″ position shown in Fig. 4. Its engagement with the pin 60 on the arm 59 consequently brings the tone arm to initial playing position for a 12″ record. If, however, the pin 178 is moved to 10″ position after the hump 186 has passed the pin 185, either by manual actuation of the handle 175 or as a result of the oscillation of the arm 180 by the hump 186 that is, with the pin 178 located in the recess 188, the pin 178 being out of the path of the abutment 191, the spring 65 throws the arm 61 into contact with a pin 190 depending from the motor board 31 so that the tone arm is moved inwardly to a greater extent to locate it at initial playing position for a 10″ record.

I prefer to provide means whereby it is rendered impossible for the needle of the tone arm to descend into contact with the turntable. For this purpose I make the turntable of somewhat smaller radius than the radius of the initial playing groove of a 12″ record. Consequently, if the needle descends at initial playing position of a 12″ record and there is no 12″ record on the turntable, the needle will not engage the turntable. If the needle descends in the initial playing position for a 10″ record, and there is no record on the turntable, it enters into a groove 200 in the turntable 30, this groove being shown in Figs. 9 and 11.

In both cases the tone arm 43 descends to a lower position than it would if the needle had engaged a record. This lower position brings an extension 201 of the plate 50 into engagement with a rod 202 which is mounted on and insulated from the motor board 31.

The rod 202 is connected to an electromagnet 203 which is located in cooperative relation to an armature 204 which is carried by the latch 86, as shown in Fig. 3. When the magnet 203 is energized, the armature 204 is attracted by it and the clutch is engaged, with the result that the record-changing cycle is performed by the cam member 52. The result of this cycle is that a record is dropped from the magazine onto the turntable and this record is played in normal manner. It will, of course, be understood that the electromagnet 203 is connected to a suitable source of electric current and that the circuit is completed through the extension 201 and the mechanism of the machine, to which the source of electric current is grounded.

I prefer to provide means whereby the phonograph may be employed to repeat continuously either a 10″ or a 12″ record when the machine is used as an ordinary phonograph and not as an automatic phonograph. Thus, referring to Fig. 1, it will be noted that the arms 102 and 110 are in the position they occupy when the phonograph ceases playing. These arms are in the most extreme clockwise position which they occupy during the automatic operation of the machine.

The knob 145 is provided with a pointer 205 which in this position cooperates with indicia indicating setting for automatic operation. If the knob 145 is depressed and rotated in the clockwise direction, as viewed in Fig. 1, the pin 142 is removed from the opening 144 in the hub 131 and it is moved away from the opening 144 so as to be out of the ambit of that opening. In this way the knob 145 may be adjusted into 10″ repeat position and 12″ repeat position, as indicated in Fig. 1.

In the 10″ repeat position the arms 102 and 110 are merely disconnected from the cam member 52 and the periodic rotation of he cam member 52 merely effects the elevation of the tone arm and its return to initial 10″ playing position. This initial 10″ playing position is assured automatically, since, as explained above, the machine automatically plays a 10″ record except when it is set for a 12″ record by hand or by the presence of a 12″ record in the lowermost record position of the magazine.

When the knob 145 is rotated still further in the clockwise direction as viewed in Fig. 1, that is, to bring the extension 205 into 12″ repeat position, a cam member 206 (Fig. 10) is brought into engagement with an inwardly directed bracket member 207 on the upper end of the lever 173 so as to swing the upper end of this lever outwardly into 12″ position. The outward swinging of the upper end of the lever 173 results in the counter-clockwise swinging of the lever 176, as viewed in Figs. 4 and 5. This movement results in the swinging of the pin 178 into the 12″ initial playing position shown in Fig. 4. It will be noted that when the cam 52 rotates and the hump 186 engages the pin 185 to swing the arm 180 away from the pin 178, which occurs during each rotation of the cam member 52 as previously described, the pin 178 does not change its position to the 10″ initial playing position shown in Fig. 5, since the lever 176 is held in the position shown in Fig. 4 by the engagement of the cam 206 with the member 207.

I preferably provide means for holding the knob 145 in the 10″ repeat or 12″ repeat position. This may suitably be effected by a spring-pressed member 208 which is adapted to enter into notches 209 and 210 in the yoke member 117, when the knob 145 is moved into 10″ repeat position or 12″ repeat position, respectively.

The operation is as follows: If, in the previous operation of the machine, a predetermined number of records has been played which is equal to the number of records on the machine, the motor will be stopped by the arm 153 engaging the lever 148, owing to the fact that no records remain in the magazine. The knob 156 will have the indication "1" in register with the mark and the leaves 168 and 169 will be in contact, the motor having been stopped by the separation of the leaves 147 and 146.

The relation of the arms 102, 108 and 110 is that shown in Fig. 20. The button 154 is now depressed, with the result that the motor goes into operation, carrying the arm 110 away from the arm 108. The arm 108 now springs into its normal position and the leaf 147 is latched in contact with the leaf 146. Operation of the motor continues until the arm 110 is brought into its full line position shown in Fig. 1. When that position is attained, the pin 164 actuates the arm 163, moving the knob 156 to zero position.

The corresponding movement of the escapement wheel 159 effects the depression of the leaf 168 away from the leaf 169. The mechanism is now in arrested relation corresponding to Fig. 5. This condition of the mechanism is the same as if the machine had been stopped after playing the same number of records out of a larger number of records placed on the machine. To reload the machine the knob 145 is depressed and the arms 102 and 110 are rotated into their dot-and-dash position shown in Fig. 1. The records may now be removed by vertical movement.

The new batch of records which is to be played is then applied to the machine. The first record to be played is placed upon the turntable. The arms 110 and 102 are then returned to their full line position shown in Fig. 1, by reverse rotation of the knob 145, and the remainder of the batch of records to be played is placed upon the three arms 110, whereupon the pin 142 enters into the recess 144 of the boss 131, thus operatively connecting all the arms 102 and 110 to the main cam 52.

The handle 175 is actuated, if necessary, to set the tone arm return for a 10" or a 12" record, depending upon the size of the first record which has been placed on the turntable. If the first record is a 12" record, the handle 175 is pulled outwardly, which brings the pin 178 into the recess 187 of the arm 180. If the first record is a 10" record, the arm 175 is pushed inwardly in case it has its outward position, with the result that the pin 178 is brought into the recess 188.

The knob 156 is now rotated to bring the number corresponding to the number of records which it is desired to play into register with the mark on the cover 129. The rotation of the knob 156 permits the leaf 168 to engage the leaf 169, thus closing the motor circuit. The main cam member 52 now starts a semi-rotation from its position in Fig. 5 into its position in Fig. 4. The consequent displacement of the eccentric 134 moves the arms 110 and 102 into their full line position shown in Fig. 2, and the records above the turntable drop onto the arms 102. Toward the end of this semi-rotation, the pin 62 rides over the fall 66 of the lateral cam 63, the spring 65 moving the arm 61 in counterclockwise direction against the pin 60 on the arm 59. The arm 61 is arrested in the manner previously described, that is, either by the pin 178 or by the pin 190, depending upon the setting of the lever 173 for a 12" or a 10" record.

As the main cam member 52 approaches its position shown in Fig. 4, the cam 82 on the disc 74 engages the pin 83 and disconnects the clutch in the manner previously described. The main cam member 52 is then stopped in the position shown in Fig. 4. As the cam member 52 moves into this position, the pin 49 descends the fall 98 on the cam track 51, and the tone arm moves vertically downward, bringing its needle into the outer grooves of the record. The record is now reproduced, the tone arm moving inwardly over the record, this movement being permitted by the interruption of the cam 63 which allows pin 62 to move inwardly through the path of the cam towards its position in Fig. 4. At the end of the playing of the record, the latch 86 is actuated in the manner previously described, re-engaging the clutch.

The main cam 52 begins to rotate in the counter-clockwise direction from the position shown in Fig. 4. The hump 186 on this cam swings the arm 180 so that the lever 176 which carries the pin 178 moves from its position shown in Fig. 4 into its position shown in Fig. 5. The rise 100 on the cam track 51 raises the rod 49 and thereby moves the pick-up upwardly from the record. The rise 64 on the lateral cam 63 then engages the pin 62 and swings the tone arm away from the records into the position shown in Fig. 1.

The eccentric 134, moving from the position shown in Fig. 4 into the position shown in Fig. 5, swings the arms 102 and 110 from their full line position in Fig. 2 towards their dot-and-dash position in that figure. In the initial part of this movement each arm 110 carries its associated arm 108 into contact with the lowermost of the records supported on the arms 102. If this lowermost record is a 12" record, it is engaged by the inclined faces 121 of the arm 108, with the result that the stack of records is elevated from the arms 102 as shown in Fig. 22. The arms 108 are arrested by the engagement of their walls 124 with the edge of the lowermost record.

The elevation of the stack of records locates the upper surface of the lowermost record in alignment with the arms 110 as they rise out of the recesses 125 on the arms 108 and into the stack of records between the two bottom records of the stack, as has been previously described in connection with Fig. 22. After the arms 110 have thus entered the stack, the projection 172 of the member 170 engages the periphery of the record and is displaced so as to throw the levers 173 and 176 from 10" position to 12" position, these levers having been set in this 10" position at the beginning of rotation of the cam member 52. This relation is shown in Fig. 6.

Continued movement of the arms 102 and 110 into the position shown in Fig. 1 results in the dropping of the lowermost 12" record onto the turntable. This occurs approximately when the main cam member has completed half a revolution and is in the position shown in Fig. 5. The continued revolution of the cam member 52 returns the arms 102 and 110 into their position shown in Fig. 2, and when that position is attained the arms 110 move back into the recesses 125 in the arms 108 and resume their strong frictional engagement with those arms.

In the latter part of the first half of the revolution of the cam member 52, the pin 164 oscillates the lever 163 so that the escapement 159 is moved one tooth towards stopping position and the knob 156 is rotated so that the next lower number is brought into registry with the mark on the cover 129. Towards the end of the complete revolution of the main cam member 52 the pin 62 of the tone arm assembly rides down the cam 66 and the arm 61 moves the tone arm assembly into the initial playing position for a 12" record. Thereafter, the pin 49 rides down the fall 98 of the cam track 51 and the needle is applied to the 12" record on the turntable in initial playing position. At this point the cam 82 disconnects the clutch and the main cam 52 is arrested.

The cycle for a 10" record is substantially similar, but in this case the hump 186 sets the pin 178 and lever 176 into 10" playing position at the beginning of the rotation of the cam member 52, and this setting is not disturbed because the projection 172 does not come into contact with the 10" record about to be dropped onto the turntable. Consequently, when the pin 62 rides down the cam fall 66, the arm 61 is permitted to travel a greater distance, that is, until it contacts the pin 190. This greater distance effects the movement of the tone arm into initial playing position for a 10" record.

In this record changing cycle the arms 108 travel to a greater extent with the arms 110, with the result that their faces 122 are brought into contact with the lowermost records and effect the raising of the stack of records until the arms 108 are stopped by the associated walls 123. The faces 122 raise the stack of records to a slightly greater height than do the faces 121, so that the arms 110 are properly located for entry into the stack above the somewhat thinner 10" records, as has been previously described in connection with Fig. 23. It will be understood in both cases that the arms 108 remain in contact with the records until the arms 110 have moved away sufficiently from the arms 108 to permit these arms to move back to their normal position under the influence of their springs 111.

As has been previously explained, the machine is brought to a stop in either of two ways. If the knob 156 is set for a lesser number of records than are applied to the machine, including the first record placed upon the turntable, then after the indicated number of records has been played the machine goes into the record changing cycle and the pin 164 oscillates the arm 163 and actuates the escapement 159 so as to bring the projection 166 into engagement with the rod 167, thereby depressing the leaf 168 and opening the motor circuit. If, however, the knob 156 is set for the playing of a number of records applied to the machine, including the record placed on the turntable, or for a greater number, then after all the records have been played the machine will go into a record dropping cycle and the arms 102, 110 and 108 will move into the position shown in Fig. 20, the arm 108 not being arrested by any record supported by the arms 102. This movement of the arm 108 brings the arm 153 into engagement with the latch 146, with the result that the leaf 147 moves upwardly away from the leaf 146, thus breaking the motor circuit.

If the machine is started with records in the magazine and no record on the turntable, the needle will descend in either the 10" initial playing position or the 12" initial playing position. In the former case it will enter into the groove 200. If it descends in the 12" playing position the needle will miss the turntable and move below its normal playing position. In either case the electromagnet 203 is energized and the latch 86 is promptly tripped and the cam member 52 is put into rotation. This results in the dropping of the lowermost record onto the turntable and the playing of that record.

If it is desired to have the machine play a 10" record repeatedly, the knob 145 is moved to the 10" repeat position shown in Fig. 1. As previously described, this renders the arms 102 and 110 stationary and permits the repeated playing of the 10" record, the tone arm 49 being actuated by the cam member 52 in the manner previously described.

If it is desired to play a 12" record repeatedly, the knob 145 is moved still further in the clockwise direction as viewed in Fig. 1, that is, to the 12" repeat position. In this position the arms 102 and 110 are disconnected from their normal drive and at the same time the cam 206 maintains the lever 173, and consequently the pin 178, in 12" playing position.

Although the invention has been disclosed in connection with the specific details of a preferred embodiment thereof, it must be understood that such details are not intended to be limitative of the invention except in so far as set forth in the accompanying claims.

Having thus described my invention, what I claim as new and desire to secure by Letters Patent of the United States is:

1. In an automatic phonograph, in combination, a turntable, an escapement supporting means for maintaining a stack of records above said turntable, said escapement means comprising a member having one position below said stack and a second member approximately the thickness of a record thereabove and located in corresponding relation laterally to said stack, means for actuating said escapement means to bring the second member into the stack above the lowermost record and to bring the first said member clear of the lowermost record whereby said record is freed to fall on to the turntable, and an element associated with the second member adapted to engage the lowermost record and support the stack at a predetermined height when said second member is entering the stack.

2. In an automatic phonograph, in combination, a turntable, an escapement supporting means for maintaining a stack of records above said turntable, said escapement means comprising a member having one position below said stack and a second member approximately the thickness of a record thereabove and located in corresponding relation laterally to said stack, means for actuating said escapement means to bring the second member into the stack above the lowermost record and to bring the first said member clear of the lowermost record whereby said record is freed to fall on to the turntable, and an element associated with the second member and movable therewith, said element having a cam surface adapted to engage the lowermost record adjacent the position at which the second member enters the stack, to elevate the stack slightly and to support the stack at a definite position while said second member is entering the stack.

3. In an automatic phonograph, in combination, a turntable, escapement supporting means for maintaining a stack of records above said turntable, said escapement means comprising members having one position below said stack and second members approximately the thickness of a record thereabove and located in corresponding relation laterally to said stack, means for actuating said escapement means to bring the second members into the stack above the lowermost record and to bring the first said members clear of the lowermost record whereby said record is freed to fall onto the turntable, elements adapted to move with said second members, and means releasably securing said second members and said elements together, each said element having a cam surface adapted to engage the lowermost record adjacent the point of entry of said second members into the stack, to elevate the stack slightly and to definitely locate the stack to align the second members with the upper surface of the lowermost record at their points of entry into the stack.

4. In an automatic phonograph, in combination, a turntable, escapement supporting means for maintaining a stack of records above said turntable, said escapement means comprising members having one position below said stack and second members approximately the thickness of a record thereabove and located in corresponding relation laterally to said stack, means for actuating said escapement means to bring the second members into the stack above the lowermost record and to bring the first said members clear of the lowermost record whereby said record is freed to fall onto the turntable, elements adapted to move with said second members, and means releasably securing said second members and said elements together, each said element having a cam surface adapted to engage the lowermost record adjacent the point of entry of said second members into the stack, an abutment associated with said cam surface adapted to engage the periphery of the lowermost record while the associated second member moves inwardly away from and disengages the elements, whereby the stack is elevated slightly and the second members are aligned with the upper surface of the lowermost record at their points of entry into the stack, and means for moving said elements back to their initial position clear of the records in the stack when disengaged.

5. In an automatic phonograph, in combination, a turntable, escapement supporting means for maintaining a stack of records of large and small size above said turntable, said escapement means comprising members having one position below said stack and second members approximately the thickness of a large record thereabove and located in corresponding relation laterally to said stack, means for actuating said escapement means to bring the second members into the stack above the lowermost record and to bring the first of said members clear of the lowermost record whereby said record is freed to fall on to the turntable, elements adapted to move with said second members, means releasably securing said second members and said elements together, each said element having a pair of cam surfaces adapted to engage a large or small record in the lowermost position in the magazine adjacent the point of entry of said second members into the stack, an abutment associated with each cam surface adapted to engage the periphery of the lowermost record while the associated second member moves inwardly away from and disengaging the element, whereby the stack is elevated slightly and the second members are aligned with the upper surface of the lowermost record at their points of entry into the stack, said cam surfaces being adapted to elevate the stack to a greater extent when the associated elements engage a small record and to a lesser extent when the elements engage a large record, and means for moving said elements back to their initial position clear of the records in the stack when disengaged.

6. In an automatic phonograph, in combination, a turntable, a player arm, record changing means including means for automatically locating said player arm at either of two initial playing positions of records of different sizes, said turntable terminating short of one initial playing position and having an annular groove at the other initial playing position, and means actuated by said player arm when it descends below record engaging height in either initial playing position for initiating the operation of said record changing means.

7. In an automatic phonograph, in combination, a turntable, escapement means for maintaining a stack of records above said turntable comprising a pair of supporting members in angular relation, one member being vertically spaced above the other and being in the form of a blade adapted to enter the stack of records above the lowermost record, automatic means for moving said escapement means to free the lowermost record, a member movable with said blade towards the lowermost record of the stack and adapted to engage and to be arrested by said record when said blade enters the stack, a motor for operating said phonograph, and a switch controlling said motor adapted to be opened by said member when it moves inwardly of its innermost record engaging position.

8. In an automatic phonograph, in combination, a turntable, a player arm, escapement supporting means for maintaining a stack of records above said turntable, record changing means adapted to be actuated periodically for operating said escapement means to free a record to drop on the turnable, means actuated by said record changing means for locating the player arm at an initial playing position, means selectively determining the initial playing position at either of two locations, means operated by the record changing means for setting the position determining means for the inner location, and means movable with said escapement means adapted to engage a large record in the lowermost stack position and to set the position determining means for the outer location.

9. In an automatic phonograph, in combination, a turntable, a player arm, escapement supporting means for maintaining a stack of records above said turntable, record changing means adapted to be actuated periodically for operating said escapement means to free a record to drop on the turntable, cam means actuated by said record changing means for locating the player arm at an initial playing position, latch means selectively determining the initial playing position at either of two locations, means operated by the record changing means for setting the position determining means for one location, lever means for setting the position determining means for the other position, and a lever pivotally mounted on said escapement means and moveable bodily therewith adapted to engage a large record in the lowermost position in the stack and to operate said lever means to adapt the player arm location for the playing of said large record.

10. An escapement mechanism for automatic phonographs comprising an upper and a lower supporting member connected together for simultaneous movement, a follower member movable with and relative to the upper supporting member, said follower member having a recess in which the upper supporting member is adapted to be received, said follower member being adapted to be arrested independently of the upper supporting member and having a record contacting portion below the upper supporting member, and cam means on the follower at the forward edge of the recess arranged to elevate the second supporting member slightly as it moves away from the follower member.

11. An escapement mechanism for automatic phonographs comprising an upper and a lower supporting member connected together for simultaneous movement, a follower member movable with and relative to the upper supporting member, said follower member having a recess in which the upper supporting member is adapted to be received, said follower member being adapted to be arrested independently of the upper supporting member and having a record contacting surface below the upper supporting member, cam means on the follower at the forward edge of the recess arranged to elevate the second supporting member slightly as it moves away from the follower member, and means on the forward side of the follower member for facilitating the return of said upper supporting member into said recess.

12. An escapement mechanism for automatic phonographs comprising a lower member adapted to support a stack of records, an upper assembly including a blade adapted to enter the stack above the lowermost record, said member and blade being operatively connected together, means for actuating said lower member and blade simultaneously whereby the blade enters the stack and the lower member is thereafter withdrawn from the stack to release the lowermost record, said upper assembly comprising means adapted to abut against the lowermost record before release, and cam means associated with said assembly for elevating said blade into a position in alignment with the upper surface of the lowermost record.

13. In an automatic phonograph having a turntable, a player arm, escapement supporting means for maintaining a stack of records above said turntable, record changing means arranged to be actuated periodically for operating said escapement means to free the lowermost record of the stack to drop on the turntable and means actuated by said record changing means for moving the player arm towards initial playing positions, in combination, means defining the initial playing position for a smaller and a larger record, means carried by the escapement and movable therewith arranged for actuation by a larger record in the lowermost position in the stack, and means operatively connecting last said means to said defining means whereby said defining means is located in initial playing defining position for a larger record by such a record in the lowermost position in the stack and in initial playing defining position for a smaller record when such a record is in the lowermost position in the stack.

14. In an automatic phonograph having a turntable, a player arm, escapement supporting means for maintaining a stack of records above said turntable, record changing means arranged to be actuated periodically for operating said escapement means to free the lowermost record of the stack to drop on the turntable and means actuated by said record changing means for moving the player arm towards initial playing positions, in combination, means defining the initial playing position for a smaller and a larger record, a member pivotally mounted on said escapement means and bodily movable therewith arranged to be engaged by a larger record in the lowermost position in said stack and to clear a smaller record in said position, means driven by the record changing means normally moving the initial playing position defining means to its position for a smaller record, and means actuated by said member when engaged by a larger record for controlling the movement of said defining means into its position for a larger record.

15. In an automatic phonograph having a turntable, a player arm, escapement supporting means for maintaining a stack of records above said turntable, record changing means arranged to be actuated periodically for operating said escapement means to free the lowermost record of the stack to drop on the turntable and means actuated by said record changing means for moving the player arm towards initial playing positions, in combination, means defining the initial playing position for a smaller and a larger record, and means for locating said defining means selectively in either of its positions, last said means including a lever pivotally mounted on said escapement means and bodily movable therewith arranged to be engaged by a larger record and cleared by a smaller record in the lowermost position in said stack.

16. In an automatic phonograph having a turntable, escapement means adapted to support a stack of records above the turntable, said escapement means comprising a lower support member and an upper blade adapted to enter the stack above the lowermost record, said blade and member being operatively connected together in angular relation, whereby they may be moved together to move the blade into the stack and move the member clear of the stack, in combination with a member movable with said escapement means arranged to elevate the lowermost record off the support member and bring its upper surface into substantial alignment with the upper blade.

17. In an automatic phonograph having a turntable, escapement means adapted to support a stack of records above the turntable, said escapement means comprising a lower support member and an upper blade adapted to enter the stack above the lowermost record, said blade and member being operatively connected together in angular relation, whereby they may be moved together to move the blade into the stack and move the member clear of the stack, in combination with a member movable with said escapement means arranged to engage the lowermost record of the stack when the blade is about to enter the stack, and a pair of means on said member arranged to cooperate with a smaller and a larger record in the lowermost position of the stack and elevate the lowermost record off the lower support member different amounts to bring the top surface thereof into substantial alignment with the blade.

18. In an automatic phonograph, in combination, a turntable, and an escapement means for supporting a stack of records above the turntable and adapted, when actuated, to release the lowermost record of the stack, said escapement means including a lower arm member arranged to support the stack and an upper blade arm member arranged to clear the stack and to enter the stack above the lowermost record, said arm members being connected so that the upper blade arm member enters the stack before the lower arm member clears the stack whereby only the lowermost record is released, and means for elevating the stack including the lowermost record, before the entry of the upper blade arm member into the stack so that the top surface of the lowermost record is aligned with the upper blade arm member before engagement of the stack by said upper blade member.

CARL G. JOHNSON.